United States Patent
Mulholland et al.

(10) Patent No.: US 11,669,246 B2
(45) Date of Patent: Jun. 6, 2023

(54) STORAGE ALLOCATION ENHANCEMENT OF MICROSERVICES

(71) Applicant: International Business Machines Corporation, Armonk, NY (US)

(72) Inventors: Miles Mulholland, Hampshire (GB); Lee Jason Sanders, Chichester (GB); Adam Michael Farley, Eastleigh (GB); Keira Louise Hopkins, Eastleigh (GB); Jason Hughes, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/543,659

(22) Filed: Aug. 19, 2019

(65) Prior Publication Data
US 2021/0055862 A1    Feb. 25, 2021

(51) Int. Cl.
*G06F 3/06* (2006.01)
*G06N 5/04* (2023.01)
(Continued)

(52) U.S. Cl.
CPC .......... *G06F 3/061* (2013.01); *G06F 3/0638* (2013.01); *G06F 3/0685* (2013.01);
(Continued)

(58) Field of Classification Search
CPC ...... G06F 3/061; G06F 3/0638; G06F 3/0685; G06F 12/0269; G06F 2212/702; G06F 2212/7205; G06N 5/04; G06N 20/00
(Continued)

(56) References Cited

U.S. PATENT DOCUMENTS

| 8,271,757 B1 * | 9/2012 | Chatterjee ............. G06F 3/0685 711/165 |
| 8,442,311 B1 * | 5/2013 | Hobbs .................... H04N 19/17 382/166 |

(Continued)

FOREIGN PATENT DOCUMENTS

| CN | 105959138 A |   | 9/2016 |            |
| CN | 106330576 A | * | 1/2017 | ......... H04L 41/0631 |

(Continued)

OTHER PUBLICATIONS

Red Hat, "What are microservices?", retrieved Nov. 25, 2018 via the WayBack Machine, <https://web.archive.org/web/20181125124528/https://www.redhat.com/en/topics/microservices/what-are-microservices> (Year: 2018).*

(Continued)

*Primary Examiner* — Reginald G Bragdon
*Assistant Examiner* — Aaron D Ho
(74) *Attorney, Agent, or Firm* — Donald J. O'Brien

(57) ABSTRACT

Method and system are provided for storage allocation enhancement of microservices. A method carried out at a microservice orchestrator, includes: categorizing a microservice container, wherein the categorization defines a predicted storage behavior of the microservice container input/output operations; and providing the categorization in association with the microservice container input/output operations to a storage system for use in storage allocation of the input/output operations. A method at a storage controller includes: receiving microservice container input/output operations with an associated categorization, wherein the categorization defines a predicted storage behavior of the microservice container input/output operations; and using the associated categorization for optimizing storage alloca-
(Continued)

tion for the input/output operations and/or optimizing garbage collection performance.

20 Claims, 9 Drawing Sheets

(51) Int. Cl.
*G06N 20/00* (2019.01)
*G06F 12/02* (2006.01)

(52) U.S. Cl.
CPC .......... *G06F 12/0269* (2013.01); *G06N 5/04* (2013.01); *G06N 20/00* (2019.01); *G06F 2212/702* (2013.01); *G06F 2212/7205* (2013.01)

(58) Field of Classification Search
USPC .......................................................... 711/165
See application file for complete search history.

(56) References Cited

U.S. PATENT DOCUMENTS

| | | | |
|---|---|---|---|
| 8,560,753 B1* | 10/2013 | Hobbs | G09G 5/14 710/72 |
| 9,053,121 B2 | 6/2015 | Amit et al. | |
| 9,116,623 B2 | 8/2015 | Ashok | |
| 9,256,467 B1* | 2/2016 | Singh | G06F 9/45533 |
| 9,811,281 B2 | 11/2017 | Bivens | |
| 9,813,500 B2 | 11/2017 | Mason | |
| 9,886,314 B2 | 2/2018 | Borowiec et al. | |
| 10,769,274 B2 | 9/2020 | Hassan | |
| 2008/0282030 A1 | 11/2008 | Kalwitz et al. | |
| 2010/0165072 A1* | 7/2010 | Oike | H04L 47/15 348/14.09 |
| 2013/0205067 A1* | 8/2013 | Kettner | G06F 3/0638 711/E12.008 |
| 2014/0052945 A1 | 2/2014 | Ashok | |
| 2015/0242122 A1* | 8/2015 | Yeh | G06F 3/061 711/103 |
| 2016/0248692 A1* | 8/2016 | Kraemer | H04L 67/10 |
| 2016/0366223 A1 | 12/2016 | Mason | |
| 2017/0139833 A1* | 5/2017 | Barajas Gonzalez | G06F 12/08 |
| 2017/0180346 A1* | 6/2017 | Suarez | G06F 8/71 |
| 2017/0201597 A1* | 7/2017 | Narasimhan | H04L 41/5048 |
| 2017/0220387 A1* | 8/2017 | Borowiec | G06F 3/0604 |
| 2018/0088926 A1 | 3/2018 | Abrams | |
| 2018/0181436 A1 | 6/2018 | Chen | |
| 2018/0276116 A1* | 9/2018 | Hahn | G06F 3/0659 |
| 2018/0331905 A1* | 11/2018 | Toledo | H04L 43/0882 |
| 2019/0057213 A1 | 2/2019 | Hassan | |
| 2019/0079799 A1* | 3/2019 | Kumar | G06F 9/4843 |
| 2019/0197178 A1* | 6/2019 | Agrawal | G06F 16/285 |
| 2019/0356732 A1* | 11/2019 | Bivens | H04L 67/1097 |
| 2020/0012443 A1* | 1/2020 | Chen | G06F 3/0629 |
| 2020/0112608 A1* | 4/2020 | Patel | H04L 67/1008 |
| 2020/0233612 A1* | 7/2020 | Dalmatov | G06F 3/0631 |
| 2020/0249877 A1* | 8/2020 | McIlroy | G06F 16/1744 |
| 2020/0379659 A1* | 12/2020 | Faibish | G06F 3/0641 |
| 2021/0026571 A1* | 1/2021 | Martin | G06F 3/0608 |

FOREIGN PATENT DOCUMENTS

| | | | | |
|---|---|---|---|---|
| CN | 108664378 A | | 10/2018 | |
| CN | 108924221 A | * | 11/2018 | ........... H04L 41/145 |
| CN | 109743199 A | | 5/2019 | |
| CN | 108885582 B | | 7/2022 | |
| GB | 2520943 A | | 6/2015 | |
| WO | 2012083267 A2 | | 6/2012 | |
| WO | 2017106726 A1 | | 6/2017 | |

OTHER PUBLICATIONS

Mell et al., "The NIST Definition of Cloud Computing", Recommendations of the National Institute of Standards and Technology. Sep. 2011, 7 pages.
International Search Report and Written Opinion, International Application No. PCT/IB2020/057433, dated Nov. 3, 2020, 9 pages.
CN202080053773 First Search Report dated Jun. 8, 2022.
CN202080053773 Supplemental Search Report dated Nov. 8, 2022.
Linlin, Fu et al. (2019) Research on Containerized Deployment of Microservices [J], Computing Technology and Automation, (4): 151-155—JSJSYZDH.CNJOURNALS.net—Google Machine Translation, http://jsjsyzdh.cnjournals.net/ch/reader/view_abstract.aspx?file_no=20190428&st=alljournals.
Ravandi et al. (2018). A self-organized resource provisioning for cloud block storage. Future Generation Computer Systems. 89. 10.1016/j.future.2018.06.045.
Haotian, Xu et al. (2019). Analysis and Application of Microservice Architecture and Container Technology. Information System Engineering (4), 2. Wenku-Baidu.com—Machine Translation, https://tinyurl.com/3easmvpr.

* cited by examiner

STORAGE ALLOCATION ENHANCEMENT OF MICROSERVICES

BACKGROUND

The present disclosure relates to storage allocation of microservices, and more specifically, to enhancement of storage allocation based on communication between microservice orchestrators and block storage controllers.

Microservices are a software development mechanism designed to decouple applications from their implementations. There are various benefits to this design philosophy, notably, encouraging modularity, scalability and architecture-independent design. In recent years there has been a particular rise of containerization as means of implementing and orchestrating microservice oriented architectures. For example, KUBERNETES® (KUBERNETES is a trademark of The Linux Foundation) is an open-source container orchestration system for automating application deployment, scaling and management. It works with a range of container tools including DOCKER® (DOCKER is a trademark of Docker, Inc.).

DOCKER is a tool which packages applications as something close to lightweight virtual machines. These applications may become environment agnostic. An example of something which may be containerized may be a database. Such databases may have the associated storage specified. In KUBERNETES, the Container Storage Interface is used to implement a provisioning layer from which volumes can be created. Volumes can be provisioned and made accessible to nodes and snapshot operations performed.

SUMMARY

According to an aspect of the present disclosure there is provided a computer-implemented method for storage allocation enhancement of microservices, wherein the method is carried out at a microservice orchestrator and comprises: categorizing a microservice container, wherein the categorization defines a predicted storage behavior of the microservice container input/output operations; and providing the categorization in association with the microservice container input/output operations to a storage system for use in storage allocation of the input/output operations.

Different data characteristics may have impact on an optimal location for data in a storage system. For example, variable compressibility, application workloads such as random access or sequential access patterns, etc. may impact the optimal location of data. A further example would be knowledge passed by the microservice container regarding how long the container is likely to exist, containers that are provisioned for short period and then deleted can delay garbage collection until all storage for the container is no longer needed. Providing a categorization of microservice container input/output operations to the storage controller where the categorization is based on predicted storage behavior enables the storage allocation and garbage collection to be optimized.

The method may include providing categorization analytics for analyzing input/output operation patterns in storage systems to categorize an underlying microservice image and to categorize microservice container contexts, wherein the categorization analytics are used to categorize a microservice container. The input/output operation patterns in storage systems may include storage characteristics of input/output operations that affect the efficiency of storage allocation and garbage collection. Analyzing input/output operation patterns may use machine learning techniques to cluster into distinct patterns of use.

The method may include: receiving microservice container input/output operations issued by the microservice container; and analyzing the input/output operations with the categorization analytics to set or amend (e.g., modify) a categorization for the microservice container.

Analyzing the input/output operations with the categorization analytics to set or amend a categorization for the microservice container may include: initially categorizing the microservice container based on categorization of the underlying microservices image; and adapting the initial categorization based on a context of the microservice container. The categorization of the underlying microservices image may be based on historical storage behavior, expected time for the container to exist, and/or user configured categorization.

Adapting the initial categorization based on a context of the microservice container may include user-based tagging of microservice containers to aid categorization.

Adapting the initial categorization based on a context of the microservice container may include higher level context analysis based on a classification of the microservice container as belonging to a group of containers and the historic behavior of the group. The group may be a pod in the form of a collection of microservice containers which are co-located on hardware and share resources or the group is a service in which pods work together.

Analyzing the input/output operations with the categorization analytics to set or amend a categorization for the microservice container may include: ongoing analysis of input/output operations of a microservice container and updating the categorization. This enables the categorization to be amended on the fly in response to a workload of a container process.

Machine learning categorization techniques may be used to identify a category which is most relevant to a performance profile of the microservices container.

Providing the categorization in association with the microservice container input/output operations to a storage system for use in storage allocation of the input/output operations may include describing each or a group of input/output operations with the categorization details. This may also include passing the categorization to a garbage collection algorithm on the underlying storage system.

According to another aspect of the present disclosure there is provided a computer-implemented method for storage allocation enhancement of microservices, wherein the method is carried out at a storage controller and comprises: receiving microservice container input/output operations with an associated categorization, wherein the categorization defines a predicted storage behavior of the microservice container input/output operations; and using the associated categorization for optimizing storage allocation for the input/output operations and/or optimizing garbage collection performance.

Receiving microservice container input/output operations with an associated categorization may include: describing or tagging a group or an individual input/output operation with storage characteristics. The storage characteristics may define a storage behavior profile that indicates a required form of storage allocation for optimal storage and garbage collection.

Using the associated categorization for optimizing storage allocation for the input/output operations and/or optimizing garbage collection performance may attempt to find a best location for data and may choose to compress through in-line array compression or pool compression dependent on the category's expected behavior.

According to a further aspect of the present disclosure there is provided a system for storage allocation enhancement of microservices at a microservice orchestrator comprising: a processor and a memory configured to provide computer program instructions to the processor to execute the function of the components: a container categorizing component for categorizing a microservice container, wherein the categorization defines a predicted storage behavior of the microservice container input/output operations; and a category providing component for providing the categorization in association with the microservice container input/output operations to a storage system for use in storage allocation of the input/output operations.

The system may include a categorization analytics component for providing categorization analytics for analyzing input/output operation patterns in storage systems to categorize an underlying microservice image and to categorize microservice container contexts, wherein the categorization analytics are used to categorize a microservice container.

The system may include: a receiving component for receiving microservice container input/output operations issued by the microservice container; and an analyzing component for analyzing the input/output operations with the categorization analytics component to set or amend a categorization for the microservice container.

The analyzing component may include: a container image categorization component for initially categorizing the microservice container based on categorization of the underlying microservices image; and a context categorization component for adapting the initial categorization based on a context of the microservice container.

According to a further aspect of the present disclosure there is provided a system for storage allocation enhancement of microservices at a storage controller comprising: a processor and a memory configured to provide computer program instructions to the processor to execute the function of the components: a category receiving component for receiving microservice container input/output operations with an associated categorization, wherein the categorization defines a predicted storage behavior of the microservice container input/output operations; and a storage allocator component including a category applying component for using the associated categorization for optimizing storage allocation for the input/output operations.

The system may include a garbage collector component including a category applying component for using the associated categorization for optimizing garbage collection performance.

According to a further aspect of the present disclosure there is provided a computer program product for storage allocation enhancement of microservices, the computer program product comprising a computer readable storage medium having program instructions embodied therewith, the program instructions executable by a processor at a microservice orchestrator to cause the processor to: categorize a microservice container, wherein the categorization defines a predicted storage behavior of the microservice container input/output operations; and provide the categorization in association with the microservice container input/output operations to a storage system for use in storage allocation of the input/output operations.

According to a further aspect of the present disclosure there is provided a computer program product for storage allocation enhancement of microservices, the computer program product comprising a computer readable storage medium having program instructions embodied therewith, the program instructions executable by a processor at a storage controller to cause the processor to: receive microservice container input/output operations with an associated categorization, wherein the categorization defines a predicted storage behavior of the microservice container input/output operations; and use the associated categorization for optimizing storage allocation for the input/output operations and/or optimizing garbage collection performance.

DETAILED DESCRIPTION

Figure 1:
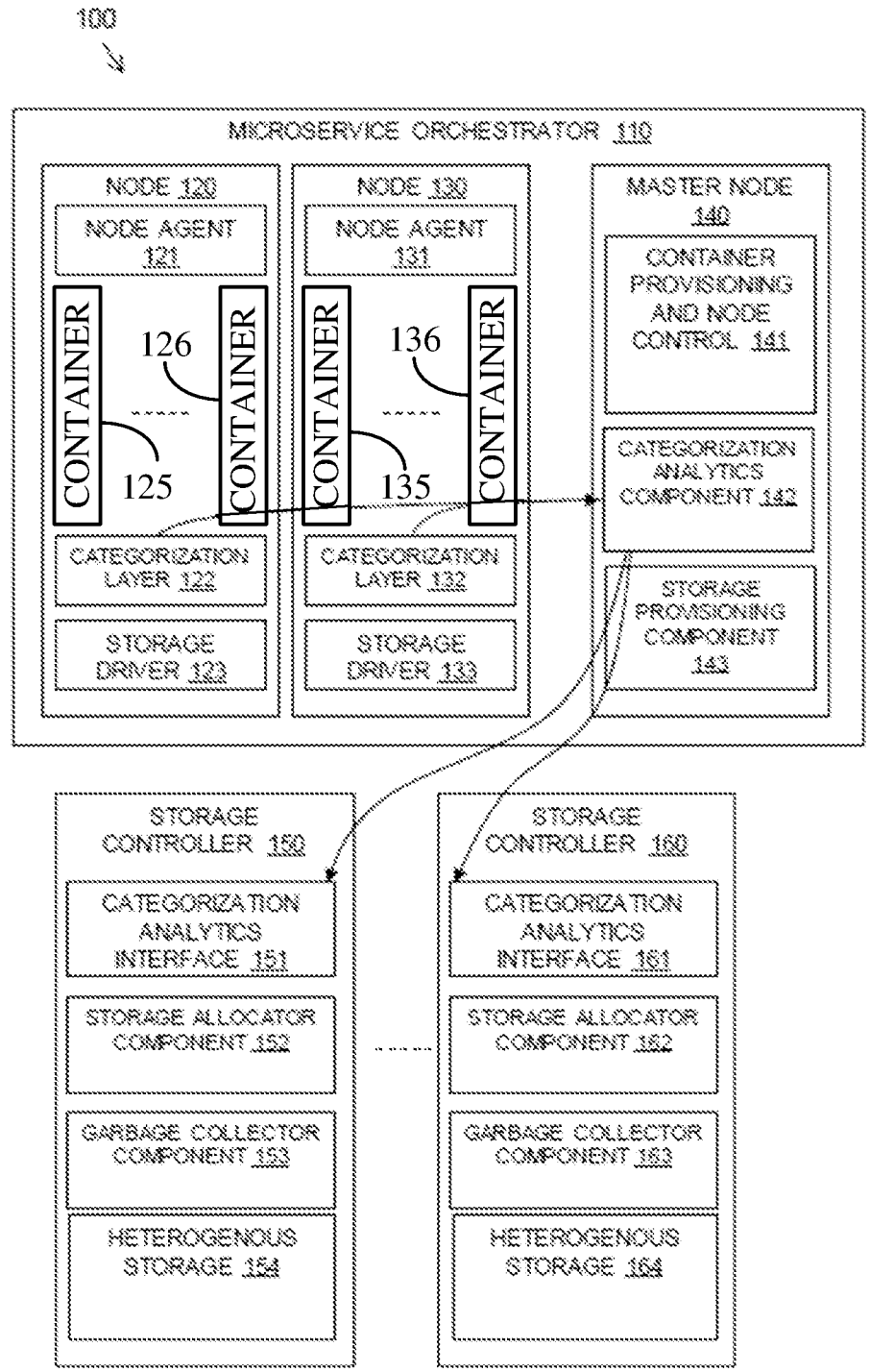
FIG. 1 is a block diagram depicting a microservices orchestrator and storage controller in which the described methods and systems may be implemented, according to at least one embodiment.

In filesystems, a location for a file may be allocated on-the-fly from a storage allocator. In block storage, provisioning may be performed by allocating the whole amount of capacity necessary for a volume in one pass (full allocation), or allocating what is required at the time. Such provisioning may use forward-lookup structures to point at the location where the data is stored. This may be similar to how filesystems "point" at the specific data using a forward lookup structure. Thin provisioning may be used as the basis of sophisticated storage efficiency tools such as compression or deduplication.

When data is written to disk, certain actions may occur. These actions may include writing the user data to the physical domain, after being allocated storage. The actions may further include updating the forward lookup structure. If already pointing at a piece of data, decrement the reference count for that piece of data. These actions may also include indicating candidates for garbage collection where a reference count for a specified piece of data is zero, and where the data is no longer considered valid. Invalidation of data may be determined based, at least in part, on reference counts.

When data is read, certain actions may occur. These actions may include accessing the forward lookup structure to find where on the physical domain the data requested lives. The actions may further include returning to zero if no location is found. Where a location is found, the data at the physical domain location may be returned.

Other actions may include deduplication and garbage collection. Deduplication can be implemented by allowing forward lookup references to point at other forward lookup structures (which in turn point at data). In these cases, the reference-count for a single piece of data can be greater than 1. Garbage collection is a mechanism that coalesces invalidated capacity into reusable regions. If a grain of data is written to the storage system and then overwritten, one cannot be certain that the overwrite fits in the same location as the original write. For this reason, one implementation is to write to clean regions. This workload is aligned with the theoretically optimal performance patterns of underlying storage media. The "dirty" regions which are subject to overwrites or UNMAPs (invalidations), need to have their live data transferred out of them into clean regions. Once all the data has been rewritten to a new region, the formerly dirty region can be reused.

The combination of container orchestrators and storage controllers may allow greater flexibility for user applications. However, the storage requirements for a given container may not be known. One solution for this is to perform blanket overprovisioning and to rely on thin provisioning capabilities of the underlying storage devices to ensure acceptable levels of inefficiency. For example, if there is overallocation in a block storage system and then none of it is used, the underlying storage required for the root node of the forward lookup metadata structure is used, but may use no further storage. This structure can be sized in the kilobyte to megabyte range, whilst there may be a pool sized in the petabyte range, making such an overhead negligible.

The described method and system categorize microservice containers and the underlying images they are based off. The categorization is based on the behavior of the microservice image with the context of the current use of the container. These details are fed to the storage system to predict how the input/output operations of the container is likely to behave. The storage system allocates storage, attempting to allocate storage to regions which minimize garbage collection overheads.

Input/output operation patterns of containers have effects on efficient storage allocation and garbage collection of invalidated capacity in a storage system. The input/output operation patterns may be categorized based on storage characteristics that influence their storage behavior including garbage collection behavior.

Containers may be categorized based on their input/output operation patterns with various selection criteria, which can be clustered using Machine Learning techniques into distinct patterns of use. These selection criteria may include, for example, how sequential or random the data pattern is, how long lived the operations and long lived the whole container is going to be; how compressible the data is, etc. Application centric concepts may also be used to categorize the impact of slow input/output operations on a given process (for example, how long a processor is stalled waiting for input/output operations). The tightness of invalidations can be used based on a workload's "working set" of data that is subject to heavy input/output.

When a microservice is launched, it is initially categorized by the behavior of that microservice's image. This may be learnt by feedback of historical behavior indicating variability of storage characteristic of the container image. The current context of the container may also be significant and therefore applied to the current container. For example, an image being used to create a container specifically for databases may have various different behaviors based on the context of its use. Therefore, additional categorizers may be leveraged based on the context. Furthermore, the container process may continue to be analyzed, moving it from category to category based on divergence or anticipated divergence in behavior from a current mode. This may happen due to the effects of a user's workload and the continued analysis may enable the categorization to be altered on the fly.

The subject matter of the present disclosure is particularly pointed out and distinctly claimed in the concluding portion of the specification. The present disclosure, both as to organization and method of operation, together with objects, features, and advantages thereof, may best be understood by reference to the following detailed description and the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Referring to FIG. 1, a block diagram shows an example embodiment of a system 100 in which the described method and system may be provided. The system 100 includes a microservice orchestrator 110 and storage controllers 150, 160 of storage systems used by the microservice orchestrator 110.

A microservice orchestrator 110 (for example, a KUBERNETES system) may provide a platform for automating deployment, scaling and operations of microservice containers across clusters of hosts. Cloud services may offer a microservice orchestrator 110 platform or infrastructure as a service (PaaS or IaaS) on which the microservice orchestrator 110 may be deployed as a platform-providing service.

The microservice orchestrator 110 may include individual nodes 120, 130 and a master node 140 or cluster. The master node 140 is the controlling unit that manages the workload and direct communication across the system and includes a container provisioning and node control 141. The master node 140 includes a storage provisioning component 143 that acts as a container storage interface where volumes can be created and provisioned.

The nodes 120, 130 are machines including node agents 121, 131 and where containers 125, 126, 135, 136 are deployed by a container runtime. A microservice image is a file comprised of multiple layers, used to execute code in a container. An image is built from the instructions for a complete and executable version of an application and when an image is run by a container runtime, it becomes one or multiple instances of that container. Each node 120, 130 may include a storage driver 123, 133 for communicating with the storage provisioning component 143 of the master node 140 and the storage controllers 150, 160.

A storage controller 150, 160 includes a storage allocator component 152, 162 for allocating storage in heterogenous storage 154, 164 and the storage allocator component 152, 162 interfaces with the storage provisioning component 143 of a master node 140 of a microservice orchestrator 110. Each storage controller 150, 160 also includes a garbage collector component 153, 163 for reclaiming storage space.

The described method and system provide categorization of microservice container input/output operations to a storage controller 150, 160 to aid the storage allocator component 152, 162 and garbage collector component 153, 163 in performing optimally for the characteristics of the container input/output operations. The nodes 120, 130 include a categorization layer 122, 132 that interacts with a categorization analytics component 142 of the master node 140 which in turn interacts with a categorization analytics interface 151, 161 of the storage controller 150, 160.

Figure 2:
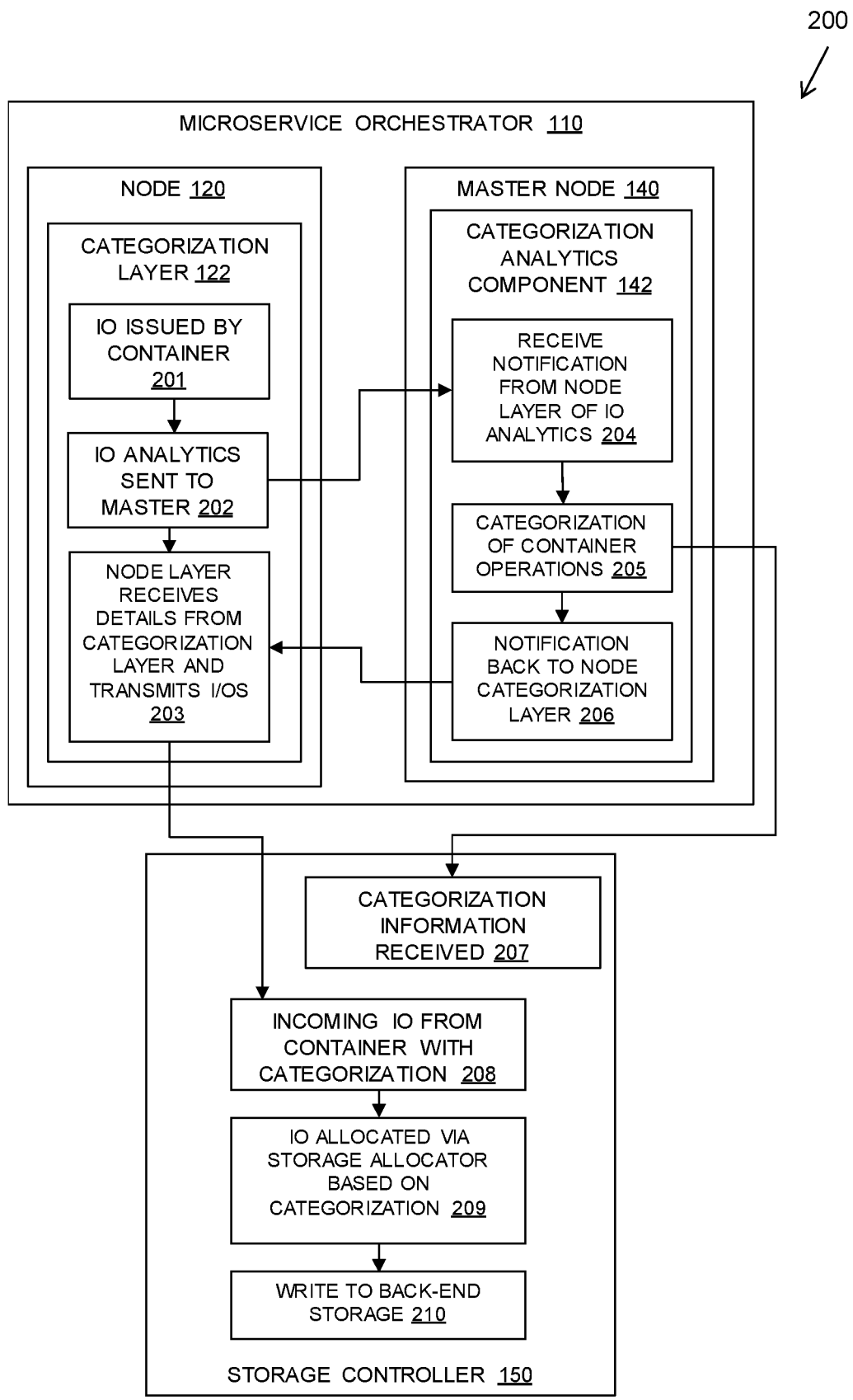
FIG. 2 is a flow diagram depicting a method performed at a microservices orchestrator and a storage controller, according to at least one embodiment.

Referring to FIG. 2, a block diagram 200 shows an example embodiment of the flow between a node 120 and a master node 140 of a microservice orchestrator 110, and to a storage controller 150.

Input/output operations are issued 201 by a container at a node 120 and categorization analytics of the operations are gathered by the individual node and are communicated 202 by the node categorization layer 122 to the master node's categorization analytics component 142 to provide and adjust categorization of a container.

The master node's categorization analytics component 142 informs the individual node of the categorization that a given container belongs to and the individual node informs the master node of any changes to input/output patterns associated with a container enabling the master node to change categorizations accordingly.

The master node's categorization analytics component 142 receives 204 a notification from a node layer of an input/output pattern for a container, categorizes 205 the container operations, and sends 206 a notification back to the node categorization layer 122. The master node 140 may send 205 container categorization information to the storage controller 150 where it is received 207 for reference when receiving container input/output operations from the nodes 120.

The container at the node 120 may receive details from the categorization analytics layer 142 of the master node and may send 203 the input/output operations for the container to the storage controller 150 with the categorization information. As the categorization information may have already been provided by the master node to the storage controller, for example, in the form of storage profiles, the input/output operations of the container may simply be tagged to identify the categorization information (i.e. a storage profile).

The storage controller 150 may receive 208 the incoming input/output operations for the container with the categorization information. The input/output operations are allocated 209 storage based on the container categorization and are written 210 to the back-end storage.

In an alternative implementation, the individual nodes may provide categorization information for a given container to the storage controller. How the categorization is transmitted may be implemented in various ways from a microservice layer. The categorization information may describe a storage profile of storage characteristics or behavior that is received and understood by the storage controller in order to be applied during container input/output operations.

Figure 3:
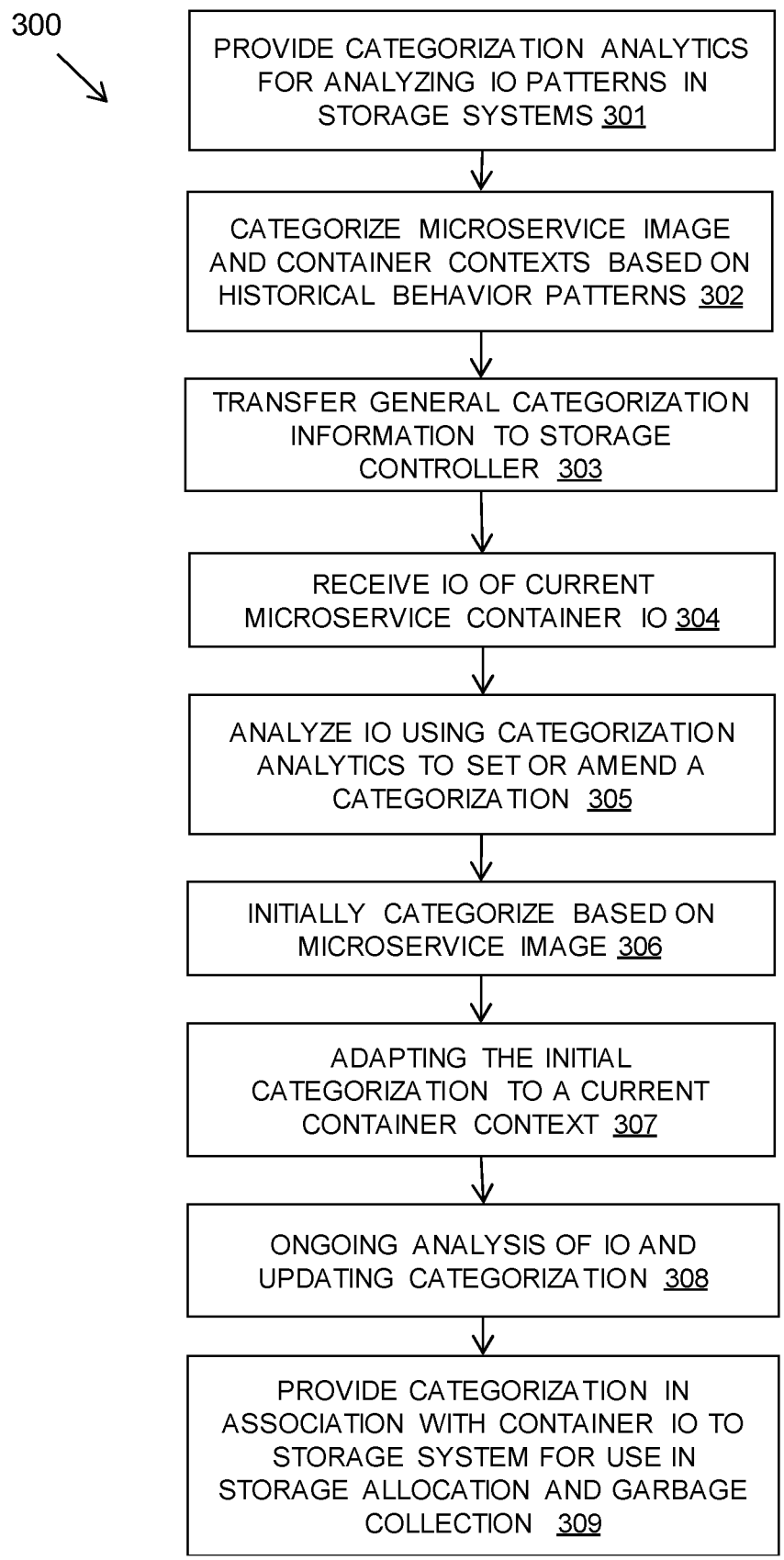
FIG. 3 is a flow diagram depicting an aspect of a method carried out at a microservices orchestrator, according to at least one embodiment.

Referring to FIG. 3, a flow diagram 300 shows an example embodiment of an aspect of the described method carried out at a microservice orchestrator 110.

In operation 301, the microservice orchestrator 110 is provided categorization analytics functionality for analyzing input/output operation patterns in storage systems. In operation 302, microservice orchestrator 110 uses the categorization analytics to categorize an underlying microservice image and microservice container contexts based on historical behavior patterns. The categorization analytics are used to categorize a runtime microservice container, where a microservice container is an instance of a microservice image with a current context.

Input/output operation patterns in storage systems may include one or more of the group of storage characteristics of: incompressible data, highly compressible data, short lifetime data, long lifetime data, random access pattern data, sequential access pattern data, fully allocated range, and application waiting profiles for operations. Analyzing input/output operation patterns may use machine learning techniques to cluster the characteristics into distinct patterns of behavior that may be categorized. These may be considered to be storage profiles for the containers.

In some embodiments, the storage characteristics are gathered using one or more methods. Such methods identifying whether or not a workload is sequential/random. Determining a compressibility of a workload and determining data durability through sampling. The lifetime of a given container can also be trivially determined by the microservice orchestrator based on the uptime upon deletion.

In some embodiments, explicit user tagging is used to classify a container as having certain properties (e.g., one or more properties). This tagging may be performed at the classifier level by suggesting that the tagging or classification is similar to a prior historic process explicitly. In some embodiments, tagging is performed at the property level stating explicitly how long a container is likely to exist and what its input/output properties are. For example, if it is known that to run a database for a given workload and a similar expected workload is created using a different database, this may be acknowledged in order to benefit from prior history made with otherwise unrelated container images. Knowing how long a container is likely to exist is also considered or input into the classification, as the duration allows determination of when all data associated with the container is to be deleted (i.e. determines a point when everything is subject to UNMAPs which has an effect on storage behavior).

In operation 303, the microservice orchestrator 110 transfers the coalesced details of the different categorizations or storage profiles to the storage controller from the container orchestrator. The transfer of the different categorizations may tell the storage controller how different categories or storage profiles are likely to behave and to allow the storage controller to make the best allocation decisions for efficient storage and garbage collection. The behavior may be indicated based on patters of historical actions, operations, characteristics, and other relevant and suitable information regarding one or more of the container, the data contained in the container, storage profiles, and operations or schedules of operations to be performed on one or more of the container and the data within the container.

In operation 304, the microservice orchestrator 110 receives microservice container input/output operations issued by the microservice container at runtime and input/output operation storage characteristics. In operation 305, the microservice orchestrator 110 then analyzes 305 the input/output operations with the categorization analytics to set a categorization for the microservice container. In some embodiments, where a categorization has already been established for the microservice container, the method may amend a categorization for the microservice container based on changes in one or more of the operations, the storage profile, or any other suitable or relevant data. The categorization is carried out on the fly to adapt for a long running process that may result in a changing categorization due to the effect of a user's workload. Categorizing a microservice container defines a predicted storage behavior of the microservice container input/output operations and is therefore used for efficient storage allocation and optimal garbage collection.

In operation 306, the microservice orchestrator 110 initially categorizes, during the categorization process, the microservice container based on the categorization of the underlying microservices image. The categorization of the underlying microservices image may be based on historical storage behavior. Behavior of past containers based on the microservice image may be analyzed to determine their behavior patterns. For example, there may be a microservice image that 90% of the time has a sequential workload that performs well with conventional hard disk drive storage (HDD). However, 10% of the time the image behaves with a random workload that can performs well with a solid-state drive (SSD). From the categorization mechanisms it may not be possible to tell whether or not the random workload is going to be used. Having a history available allows the variability of a given image to be recognized and whether or not better storage is needed based on historical behavior. The history may also indicate behavior probabilities, where the workload or the image may be compared to two or more patterns of historical behavior or profiles.

The categorization of the underlying microservices image may also or alternatively be based on user configured categorization. If a user is observing poor storage behavior, a user-defined configuration may be used to fine-tune the behavior.

In operation 307, the microservice orchestrator 110 adapts 307 the initial categorization based on a current context of the microservice container. This leverages categorization based on the context and may include user-based tagging of microservice containers to aid categorization. This may also include higher-level context analysis based on what other services are attached to the storage service. In some embodiments, a higher-level context analysis is based on a classification of the microservice container as belonging to a group of containers and the historic behavior patterns of the group. The group may be a pod in the form of a collection of microservice containers which are co-located on hardware and share resources and/or the group may be a service in which pods work together.

The microservice orchestrator 110 may achieve categorization of a container for a context in the following ways, although various methods may be suitable. When a container is being spun-up, it is typically done so in within a wider application context. A pod is a collection of containers which should be co-located on hardware and share resources and a service is a wider classifier and specifies pods which work together. When one creates a service or a pod, each storage using container can be classified as part-of-a-given service, or part of a given pod, and have the historic behavior of these contexts associated with them. Machine Learning categorization techniques can be used to identify which is most relevant to the performance profile of a given container. Labels can also typically be associated with containers, which in turn can be leveraged to aid classification. Topological approaches to attempt to classify a container may be used. If a given service is considered as a collection of nodes (potentially with different types of nodes based on the context of use), with pod/service membership determining edges, a given container can be classified based on what it is attached to through graph-analysis algorithms Based off this, it is possible to determine what the behavior of the container will be based on the behavior of the nearest historic match. Various network-motif classification mechanisms have been explored through bioinformatic techniques and one of the most common applications of these is identifying similar structures in bioinformatic networks. Machine learning categorization techniques may be used to identify a category which is most relevant to the performance profile of the microservices container.

In operation 308, the microservice orchestrator 110 includes ongoing analysis of input/output operations of a microservice container to update the categorization. In some embodiments, categorization analytics are gathered from an individual node for a current container process within the microservices orchestrator. For example, a node can tell whether or not a current workload is roughly random or roughly sequential. The container orchestrator may be informed of the input/output patterns occurring on a given container and may compile this into its categorization. A container may be subject to the nature of a user's workload that can change. For example, it may start significantly sequential as data is written for the first time, but it may become highly random/transactional as different user workload are activated. By supporting this, it is possible to change a categorization for a container.

In operation 309, the microservice orchestrator 110 provides the categorization information in association with the microservice container input/output operations from an individual node of the container orchestrator to a storage system for use in storage allocation of the input/output operations. For example, input/output operations may be tagged with the categorization. This may include describing each or a group of input/output operations with the categorization details. This also may include passing the categorization to a garbage collection algorithm on the underlying storage system.

Figure 4:
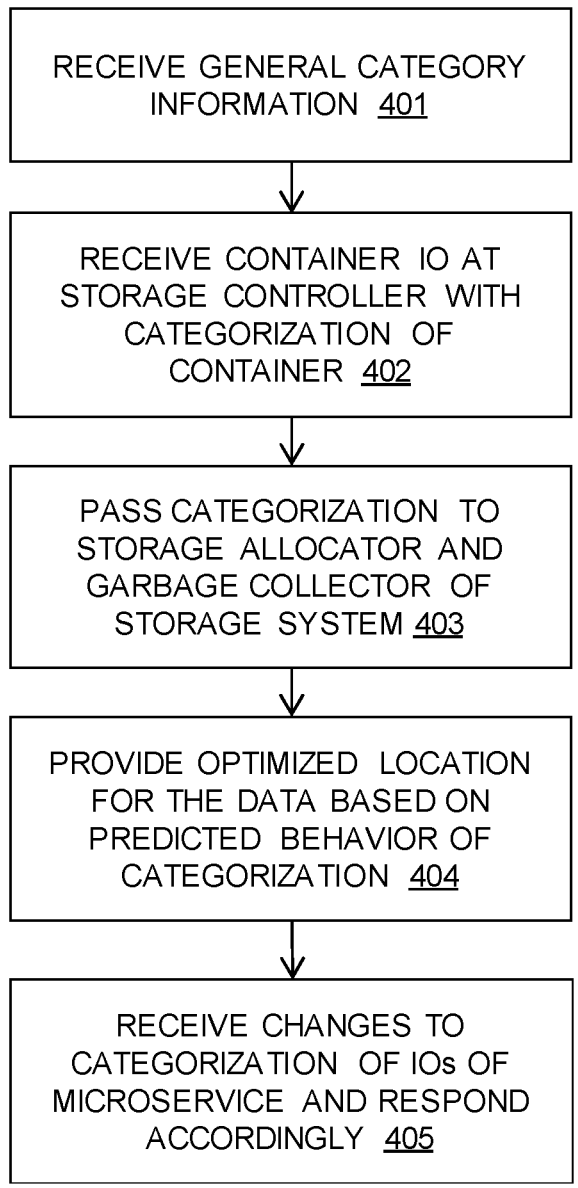
FIG. 4 is a flow diagram depicting an aspect of a method carried out at a storage controller, according to at least one embodiment.

Referring to FIG. 4, a flow diagram 400 shows an example embodiment of an aspect of the described method carried out at a storage controller 150.

In operation 401, the storage controller 150 receives general category information from a container orchestrator, for example, as a shared list of categories. These categories may be described in terms of characteristics: for example, in simple terms, a category for long-lived, incompressible data; a category for short-lived, highly compressible data. These may be shared in advance or described by the microservice orchestrator on the fly as categories are made.

In operation 402, the storage controller 150 receives microservice container input/output operations with an associated categorization, which defines a predicted storage behavior of the microservice container input/output operations. In some embodiments, the input/output operations are received, and, once received, are analyzed to determine a category associated with one or more of the input/output operations. The associated characterization may define predicted storage behavior of the input/output operations indicating corresponding predicted storage behavior of the microservice container. In some embodiments, the storage controller receives input/output operations associated with a plurality of categorizations.

In operation 403, the storage controller 150 passes the categorization to the storage allocator and garbage collector components of the storage system. This informs the storage controller that a given input/output operation belongs to a category, and as a consequence that input/output operation is likely to have a given behavior.

The categorization information may be passed to the storage allocator and garbage collection algorithm on the underlying storage system through an interface protocol.

This can either be done to describe a group of input/output operations, by tagging input/output operations with certain known service characteristics, or by including these details within the individual input/output operations. For example, a header/footer of the data frame may describe the categorization.

In operation 404, the storage controller 150 provides optimized location for the data of the input/output operations of the container based on the predicted behavior provided by the categorization. The categorization details involved may include measures of randomness, measures of expected longevity of data, measures of whether or not the system in question is waiting on input/output operations, what is the expected working set for a given set of input/output operation. The garbage collection and space allocation algorithm may then make plans, to find the best location for data with the additional data that has been provided.

In operation 405, the storage controller 150 receives or identifies changes to the categorization. The storage controller 150 may then update categorizations on the fly during a container process with the storage allocator and garbage collection components responding accordingly. The storage allocator may be informed of any changes to a microservice's categorization and will attempt to respond accordingly. This can be extended to garbage collection selection behavior, as when garbage collecting ranges belonging to a given class of microservice, one can move these ranges to a suitable new tier of storage allocation.

The following are some storage allocation techniques that may be used based on the categorization information that is provided with the input/output operations of the container. In some instances, these storage allocation techniques may allocate high-performing storage only when it is required.

Additionally, if a user is observing poor behavior, a user-defined concept may be provided to allow fine-tuning of behavior. For example, if an image has a workload that means that a workload is not being stored on high performance storage but it is suitable for that storage, being able to tune an individual workload in order to influence that workload to be allocated to the highest performing storage manually is a useful feature. Therefore, user configuration may be provided to influence the storage optimization.

Categorization of storage patterns may include measures of randomness, measures of expected longevity of data, measures of whether or not the system in question is waiting on input/output operations, what is the expected working set for a given set of input/output operations, measures of input/output size, required failure resistance, and other storage characteristics that affect the storage and garbage collection optimization.

Compressibility

Variable compressibility may have impact on the ideal location of where data should be placed. For example, this may include choosing to compress through in-line array compression or pool compression dependent on the category's expected behavior. For example, in-line hardware compression achieved by arrays have a maximal compressibility support of about 4:1, whereas data reduction pool implemented compression of a same product can achieve compressibility exceeding 10:1, but at the cost of additional latency.

The orchestrator may inform the storage controller that the container just created is likely to create incompressible data. The storage controller may then choose not to attempt to compress input/output operations associated with the container, in turn saving compression bandwidth for input/output operations that are more likely to compress.

The orchestrator may inform the storage controller that the container just created is likely to create data which is highly compressible. On systems with limited compression bandwidth, this may be the optimal choice for space savings. The storage controller will preferentially allocate compression bandwidth to this container's data ranges.

Short-Lived and Long-Lived Data

Other features which can aid garbage collection is the concept of holding off on garbage collection through a concept known as "slack space". This is the idea that if there is enough free capacity to run into, garbage collection may become cheaper over time, as further invalidations are received. Thus, the amount of work needed to free a given region becomes cheaper. This behavior will depend highly on the locality of the data. If an application's data is spread across many different regions and those regions are shared with long-lived data, the long-lived data will need to be moved, even once all the short-lived data has been invalidated.

The orchestrator may inform the storage controller that the container is likely to have a short lifetime: i.e. the data is likely to be discarded soon. This may attempt to group together short-lived data through allocating separate regions for these shorter-lived ranges. For systems which are not input/output latency bottlenecked, a slower storage may be chosen (for example, spinning disks instead of expensive-but-fast solid-state drive options).

The storage controller allocates short-lived data-ranges to common extents, and chooses to avoid garbage collecting these extents until they are almost empty. This means that short-lived data is not mixed with long-lived data and the predicted cycle of discards frees the extents rather than requiring extensive garbage collection. Because there is no garbage collecting on these extents, less write bandwidth is used for garbage collection, which both improves performance and storage media longevity.

The orchestrator may inform the storage controller that the container is likely to have a very long lifetime. The storage controller allocates these long-lived data ranges to common extents. By avoiding mixing these with short-lived ranges, unnecessary garbage collection is avoided to free up the short-lived ranges. This results in using less write bandwidth for garbage collection, which in turn improves performance and storage media longevity.

Fully Allocated

For particularly hostile workloads, it is possible that the storage controller will allocate data ranges to fully allocated (i.e. non-log-structured-array) ranges, as the overhead of garbage collecting these may be excessive. This will result in more optimal performance.

Random and Sequential Writes

Different application workloads have different properties; a database may have a highly random-access pattern whereas a backup task may have a highly sequential access pattern. These have implications on how garbage collection is likely to perform. Typically, a sequential overwrite pattern will result in an easier garbage collection as consecutive ranges of storage can be freed up. A random overwrite pattern is often more difficult to garbage collect, as comparatively larger amounts of storage may be moved in order to reclaim an appreciable region of space. For example, sequential overwrites may have a pattern such as:

[XXXXXXXXXX] [OOOOOOOOOO]
[XXXXXXXXXX] [XXXXXXXXXX]
[NNNNNNNNNN] [FFFFFFFFFF]

In this example, F=free; X=used; O=Overwritten data; N=New data. Here, the whole region containing the overwrites can be reclaimed, without the need to move any data. In this example, random overwrites may have a pattern such as:

[XOXOXXOXXX] [XXOXOXXOXX]
[XOXOXXXXXX] [XXOXXOXXXX]
[NNNNNNNNNN] [FFFFFFFFFF]

In this example, 4 regions are moved to reclaim 1 region worth of data. This problem becomes worse as the physical domain expands. For systems which have significant random input/output patterns compared to sequential ones, selecting storage which best responds to this behavior may result in a more optimal response than picking the fastest storage available.

The orchestrator may inform the storage controller that the container is likely to have a random-access pattern. The storage controller allocates these data ranges to extents which will likely perform optimally for this workload (e.g. solid-state drives). The result of this is that these systems are subject to improved performance.

The orchestrator may inform the storage controller that the container is likely to have a sequential access pattern. The storage controller allocates these data ranges to extents which will likely perform optimally for this workload (potentially hard disk drives). The result of this is allocating storage to more optimal candidates for the workload, both improving performance for the hard disk drives, and leaving more solid-state drive capacity free for use for workloads which will benefit them most.

Waiting for Input/Output Operations

The orchestrator may inform the storage controller that the container is likely to be subject to waiting for input/output operations for significant periods of time. The storage controller may assign faster storage media to these ranges, optimizing workflows on the containers.

Working Set of Workload

A given workload may have a working set, which is the range of data that receives heavy input/output operations. The working set applies the concept that whilst there may be a total data domain of 10 PB, a few hundred TB are actually subject to heavy input/output.

If there are two different workloads: both with random access patterns and both roughly affecting the same amount of data, if these workloads were stored in the same backend space together, they would overwrite themselves at roughly the same rate. This optimizes garbage collection as space become free at approximately the same time, statistically.

This is compared to a workload that is sequential mixed with a random portion. This is almost like using two significantly different working set sizes. One will tend overwrite its part of a given region far before the other. Therefore, keeping working sets that are similar together makes garbage collection work more efficient.

These optimizations are achievable through the analytics being container/image aligned. A virtual machine aligned solution may be too coarse and might not be enough to describe the set of applications running on it. An application centric solution may be too fine grained, lacking context, and may be difficult to integrate into the input/output path for that application.

In all of these cases, variable lifetime containers may result in the defeat of approaches aligned to describe applications or virtual machines. By aligning this with a given image and potentially, the wide context of its use, heterogenous behavior can be captured on a single virtual machine and application behavior which may vary widely by context. The context in which the method is operating is a task-focused environment. By recognizing this, the most possible useful information for the storage system is captured, and thus can make storage efficiencies.

The benefits of such a system are that this should result in optimized storage placement, resulting in reduced garbage collection overheads. This in turn reduces load on storage systems and provides better host input/output operation performance.

Figure 5:
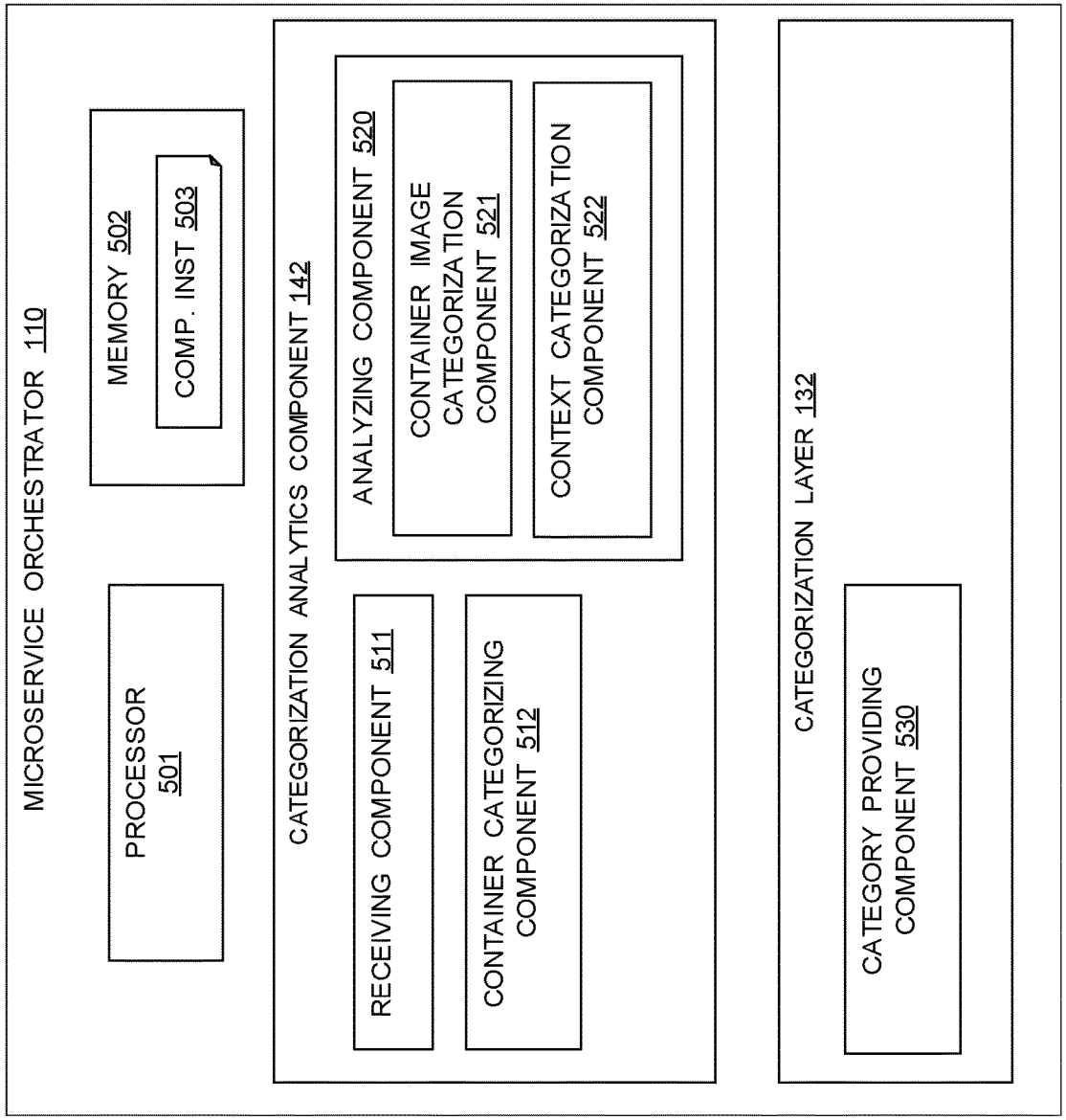
FIG. 5 is a block diagram depicting an aspect of a system including a microservice orchestrator, according to at least one embodiment.

Referring to FIG. 5, a block diagram shows an example embodiment of a microservice orchestrator 110 including a categorization analytics component 142 of a master node and a categorization layer 132 of a node. These are shown on a single system but may be distributed across multiple systems including at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The categorization analytics component 142 may provide categorization analytics for analyzing input/output operation patterns in storage systems to categorize an underlying microservice image and to categorize microservice container contexts. The categorization analytics are used to categorize a microservice container at runtime.

The categorization analytics component 142 may include a receiving component 511 for receiving microservice container input/output operations issued by the microservice container at runtime and an analyzing component 520 for analyzing the input/output operations to modify (e.g., set or amend) a categorization for the microservice container. The analyzing component 520 may include a container image categorization component 521 for initially categorizing the microservice container based on categorization of the underlying microservices image and a context categorization component 522 for adapting the initial categorization based on a context of the microservice container.

The categorization analytics component 142 may include a container categorizing component 512 for categorizing a microservice container with the categorization defines a predicted storage behavior of the microservice container input/output operations. This may be sent to the categorizing layer 132 of the node running the container. The categorizing layer 142 may include a category providing component 530 for providing the categorization in association with the microservice container input/output operations to a storage system for use in storage allocation of the input/output operations.

Figure 6:
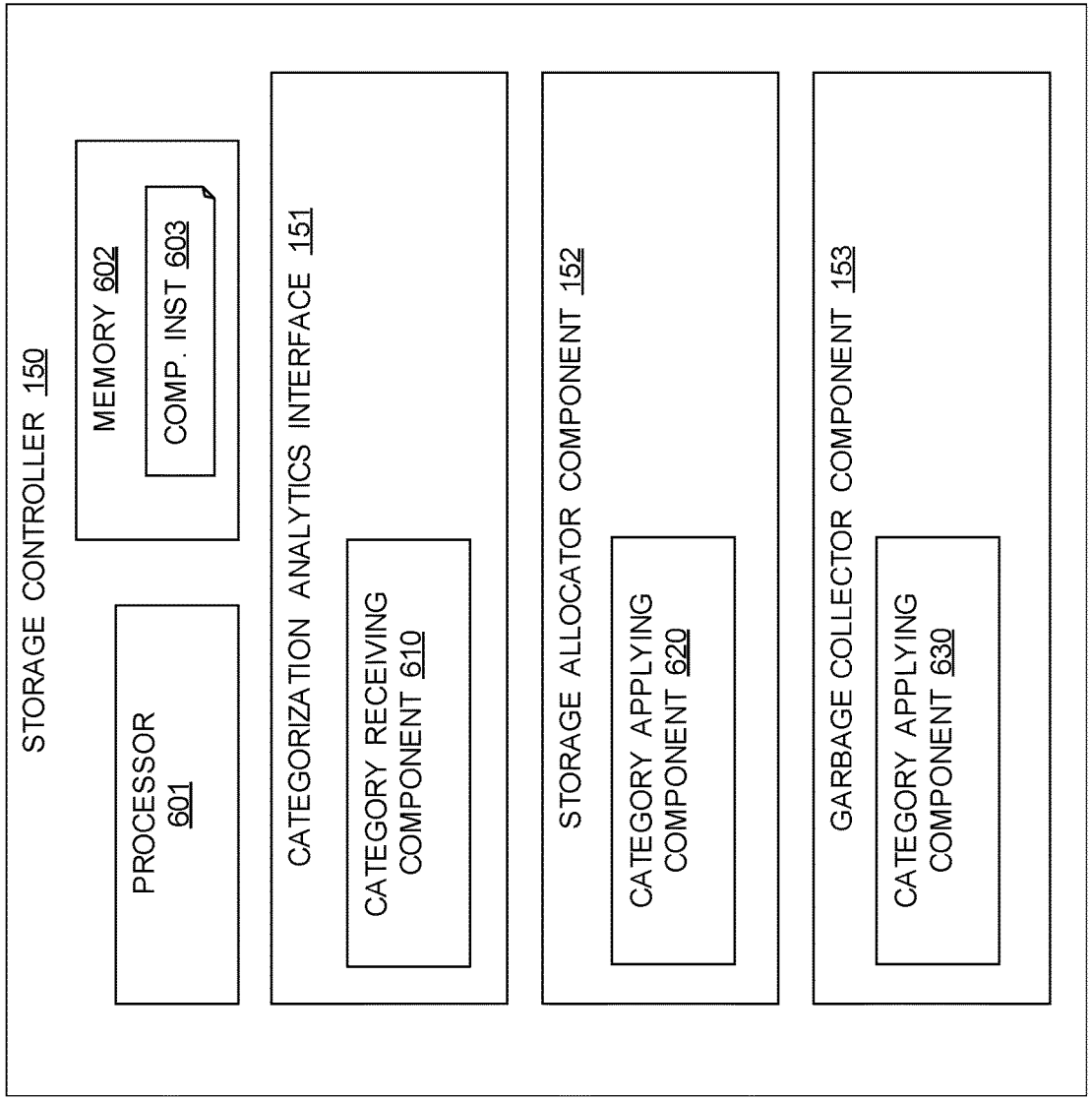
FIG. 6 is a block diagram depicting an aspect of a system including a storage controller, according to at least one embodiment.

Referring to FIG. 6, a block diagram shows an example embodiment of a storage controller 150 including a categorization analytics interface 151, a storage allocator component 152, and a garbage collector component 153. The storage controller 150 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The categorization analytics interface 151 may include a category receiving component 610 for receiving microservice container input/output operations with an associated categorization that defines a predicted storage behavior of the microservice container input/output operations.

The storage allocator component 152 may include a category applying component 620 for using the associated categorization for optimizing storage allocation for the input/output operations.

The garbage collector component 153 may include a category applying component 630 for using the associated categorization for optimizing garbage collection performance.

Figure 7:
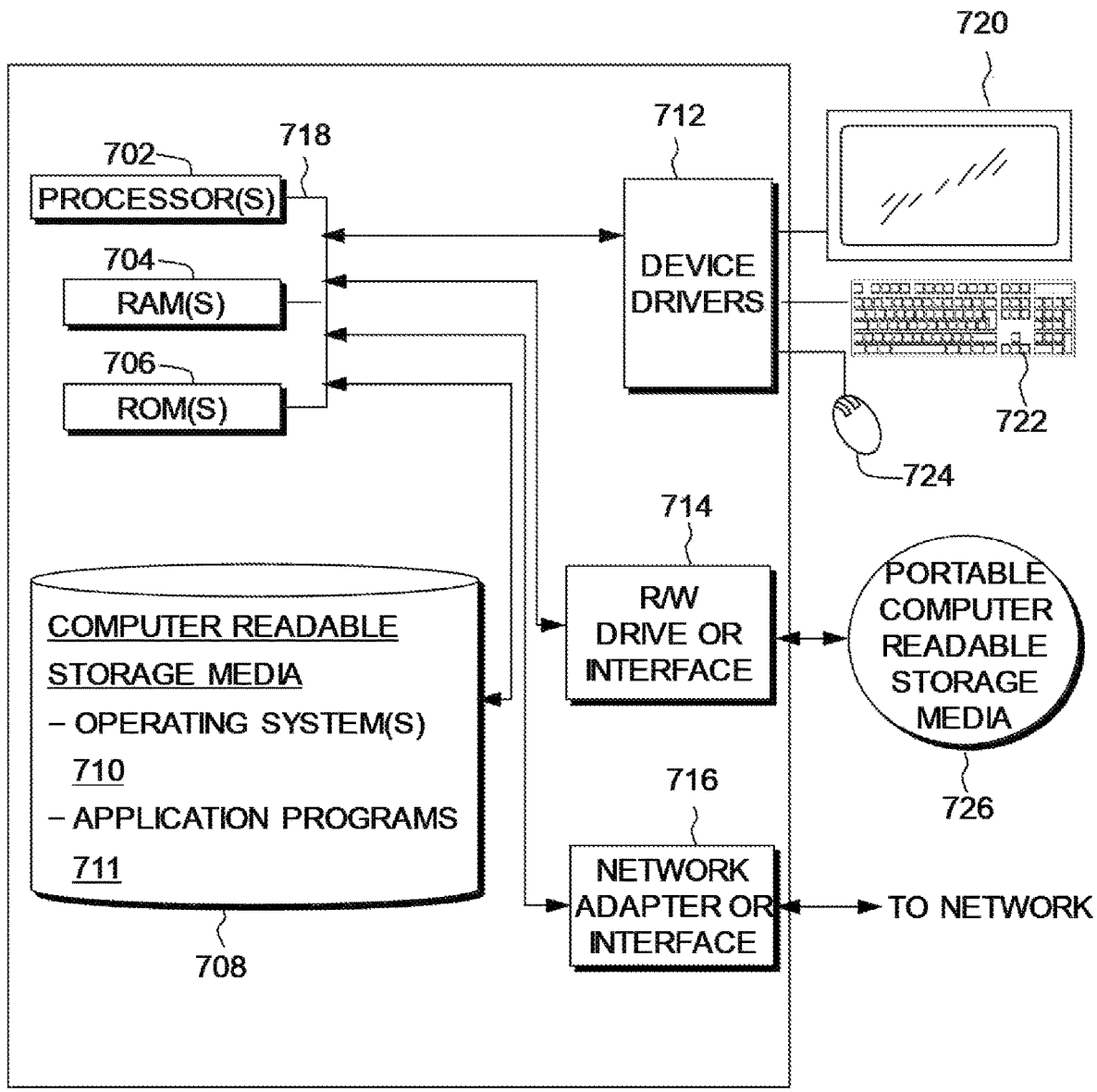
FIG. 7 is a block diagram depicting a computer system or cloud server in which the present disclosure may be implemented, according to at least one embodiment.

FIG. 7 depicts a block diagram of components of a computing device of the system 100 of FIG. 1 such as the microservice orchestrator 110 or the storage controller 150, in accordance with an embodiment of the present disclosure. It should be appreciated that FIG. 7 provides an illustration of one implementation and does not imply any limitations with regard to the environments in which different embodiments may be implemented. Many modifications to the depicted environment may be made.

Computing device can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the present disclosure.

Computing device can also include a R/W drive or interface 714 to read from and write to one or more portable computer readable storage media 726. Application programs 711 on computing device can be stored on one or more of the portable computer readable storage media 726, read via the respective R/W drive or interface 714 and loaded into the respective computer readable storage media 708.

Computing device can also include a network adapter or interface 716, such as a TCP/IP adapter card or wireless communication adapter. Application programs 711 on computing device can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing device can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present disclosure may be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain separate entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
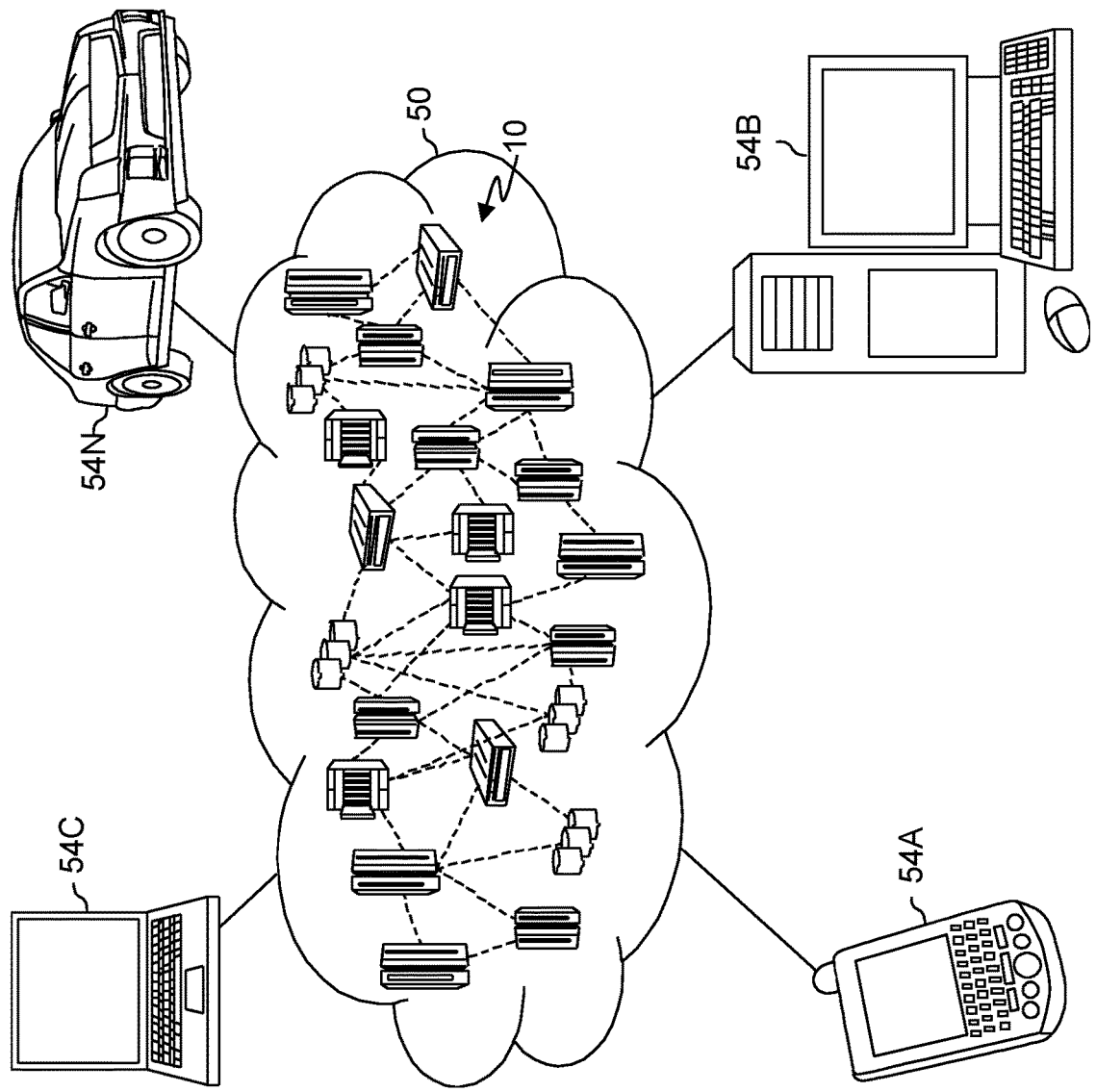
FIG. 8 is a schematic diagram of a cloud computing environment in which the present disclosure may be implemented, according to at least one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative and that computing nodes 10 and cloud computing environment 50 can communicate with any type of computerized device over any type of network and/or network addressable connection (e.g., using a web browser).

Figure 9:
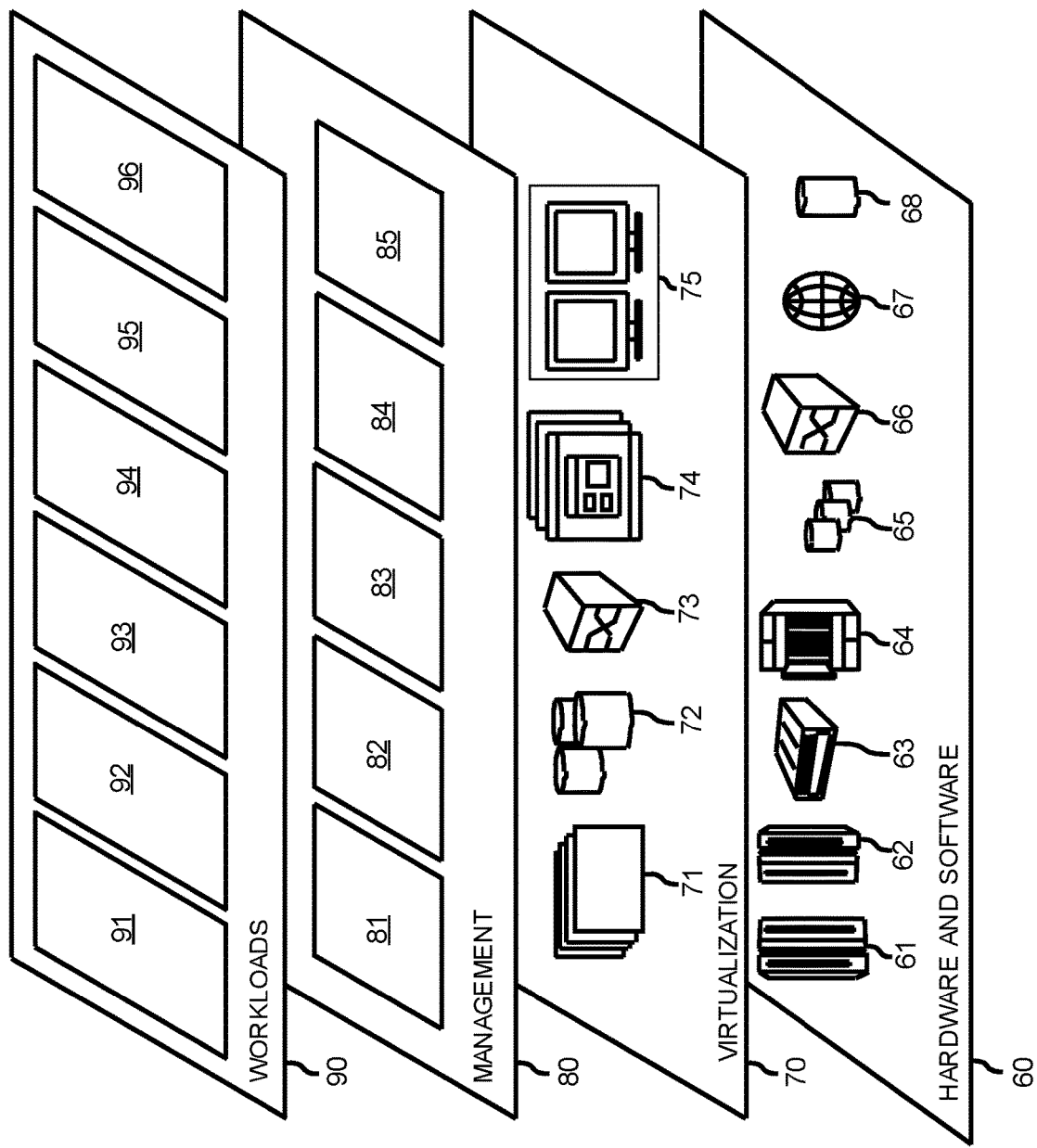
FIG. 9 is a diagram depicting model layers of a cloud computing environment in which the present disclosure may be implemented, according to at least one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container storage optimization processing 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for storage allocation enhancement of microservices, wherein the method comprises:
    providing, by a microservice orchestrator including at least one processor and a memory, categorization analytics for microservice container input/output operation patterns in storage systems, the input/output operation patterns defining storage characteristics of a microservice image of a microservice container and compressibility of data within the microservice image;

analyzing, by the microservice orchestrator, the input/output operation patterns to determine a set of categories for the microservice image and a microservice container context;

based on analyzing the input/output patterns and the microservice container context, categorizing, by the microservice orchestrator, a microservice container based on the categorization analytics, wherein the categorization defines a predicted storage behavior of the microservice container input/output operations and compressibility of data associated with the input/output operations;

providing, by the microservice orchestrator, the categorization in association with the microservice container input/output operations and the microservice container context to a storage system for use in storage allocation of the input/output operations;

selecting, by a storage controller, a compression type based on the predicted storage behavior, the compressibility of data associated with the input/output operations, and a system characteristic of the storage system;

based on the categorization, the predicted storage behavior, the selected compression type, and the compressibility of data associated with the input/output operations, identifying, by the storage controller of the storage system, a storage location for data associated with the input/output operations of the microservice container, the storage controller including at least one processor and a memory, the storage location identified by selecting a storage location from a first storage component and a second storage component, the first storage component and the second storage component having distinct storage performance characteristics;

storing the data associated with the input/output operations at the storage location in a storage format based on the categorization and the storage location; and prioritizing an allocation of compression bandwidth to the microservice container based on an indication from the microservice orchestrator describing the compressibility of data associated with the input/output operations.

2. The method as claimed in claim 1, wherein input/output operation patterns in storage systems include storage characteristics of input/output operations affecting storage allocation and garbage collection.

3. The method as claimed in claim 1, wherein analyzing input/output operation patterns uses machine learning techniques to cluster into distinct patterns of use.

4. The method as claimed in claim 1, including:
receiving microservice container input/output operations issued by the microservice container; and
analyzing the input/output operations with the categorization analytics to modify a categorization for the microservice container.

5. The method as claimed in claim 4, wherein analyzing the input/output operations with the categorization analytics to modify a categorization for the microservice container includes:
ongoing analysis of input/output operations of a microservice container and updating the categorization.

6. The method as claimed in claim 4, wherein the categorization is identified by a machine learning categorization technique as relevant to a performance profile of the microservices container.

7. The method as claimed in claim 4, wherein analyzing the input/output operations with the categorization analytics to modify a categorization for the microservice container includes:

initially categorizing the microservice container based on categorization of an associated microservices image; and
adapting the initial categorization based on the context of the microservice container.

8. The method as claimed in claim 7, wherein the categorization of the associated microservices image is based on historical storage behavior and user configured categorization.

9. The method as claimed in claim 7, wherein adapting the initial categorization based on the context of the microservice container includes user-based tagging of microservice containers to aid categorization.

10. The method as claimed in claim 7, wherein adapting the initial categorization based on the context of the microservice container includes higher level context analysis based on a classification of the microservice container as belonging to a group of containers and historical storage behavior of the group.

11. The method as claimed in claim 10, wherein the group is a pod in the form of a collection of microservice containers which are co-located on hardware and share resources.

12. The method as claimed in claim 1, wherein providing the categorization in association with the microservice container input/output operations to a storage system for use in storage allocation of the input/output operations includes describing each input/output operation with one or more categorization details.

13. The method as claimed in claim 1, wherein providing the categorization in association with the microservice container input/output operations to a storage system for use in storage allocation of the input/output operations includes passing the categorization to a garbage collection algorithm on an associated storage system.

14. A system for storage allocation enhancement of microservices at a microservice orchestrator comprising:
a processor; and
a memory, coupled to the processor, storing computer program instructions that, when executed by the processor, causes the processor to perform operations comprising:
providing, by a microservice orchestrator including at least one processor and a memory, categorization analytics for microservice container input/output operation patterns in storage systems, the input/output operation patterns defining storage characteristics of a microservice image of a microservice container and compressibility of data within the microservice image;
analyzing, by the microservice orchestrator, the input/output operation patterns to determine a set of categories for the microservice image and a microservice container context;
based on analyzing the input/output patterns and the microservice container context, categorizing, by the microservice orchestrator, a microservice container based on the categorization analytics, wherein the categorization defines a predicted storage behavior of the microservice container input/output operations and compressibility of data associated with the input/output operations;
providing, by the microservice orchestrator, the categorization in association with the microservice container input/output operations and the microservice container context to a storage system for use in storage allocation of the input/output operations;

selecting, by a storage controller, a compression type based on the predicted storage behavior, the compressibility of data associated with the input/output operations, and a system characteristic of the storage system;

based on the categorization, the predicted storage behavior, the selected compression type, and the compressibility of data associated with the input/output operations, identifying, by the storage controller of the storage system, a storage location for data associated with the input/output operations of the microservice container, the storage controller including at least one processor and a memory, the storage location identified by selecting a storage location from a first storage component and a second storage component, the first storage component and the second storage component having distinct storage performance characteristics;

storing the data associated with the input/output operations at the storage location in a storage format based on the categorization and the storage location; and prioritizing an allocation of compression bandwidth to the microservice container based on an indication from the microservice orchestrator describing the compressibility of data associated with the input/output operations.

15. The system as claimed in claim 14, wherein the operations further comprise:

receiving microservice container input/output operations issued by the microservice container; and analyzing the input/output operations with the categorization analytics component to modify a categorization for the microservice container.

16. The system as claimed in claim 15, wherein the operations further comprise:

initially categorizing the microservice container based on categorization of an associated microservices image; and adapting the initial categorization based on the context of the microservice container.

17. A computer program product for storage allocation enhancement of microservices, the computer program product comprising a computer readable storage medium having program instructions embodied therewith, the program instructions executable by a processor at a microservice orchestrator to cause the processor to perform operations comprising:

providing, by a microservice orchestrator including at least one processor and a memory, categorization analytics for microservice container input/output operation patterns in storage systems, the input/output operation patterns defining storage characteristics of a microservice image of a microservice container and compressibility of data within the microservice image;

analyzing, by the microservice orchestrator, the input/output operation patterns to determine a set of categories for the microservice image and a microservice container context;

based on analyzing the input/output patterns and the microservice container context, categorizing, by the microservice orchestrator, a microservice container based on the categorization analytics, wherein the categorization defines a predicted storage behavior of the microservice container input/output operations and compressibility of data associated with the input/output operations;

providing, by the microservice orchestrator, the categorization in association with the microservice container input/output operations and the microservice container context to a storage system for use in storage allocation of the input/output operations;

selecting, by a storage controller, a compression type based on the predicted storage behavior, the compressibility of data associated with the input/output operations, and a system characteristic of the storage system;

based on the categorization, the predicted storage behavior, the selected compression type, and the compressibility of data associated with the input/output operations, identifying, by the storage controller of the storage system, a storage location for data associated with the input/output operations of the microservice container, the storage controller including at least one processor and a memory, the storage location identified by selecting a storage location from a first storage component and a second storage component, the first storage component and the second storage component having distinct storage performance characteristics;

storing the data associated with the input/output operations at the storage location in a storage format based on the categorization and the storage location; and prioritizing an allocation of compression bandwidth to the microservice container based on an indication from the microservice orchestrator describing the compressibility of data associated with the input/output operations.

18. The computer program product of claim 17, wherein the operations further comprise:

receiving microservice container input/output operations issued by the microservice container; and analyzing the input/output operations with the categorization analytics to modify a categorization for the microservice container.

19. The computer program product of claim 18, wherein analyzing the input/output operations with the categorization analytics to modify the categorization for the microservice container further comprises:

ongoing analysis of input/output operations of a microservice container and updating the categorization.

20. The computer program product of claim 18, wherein the operations further comprise:

initially categorizing the microservice container based on categorization of an associated microservices image; and adapting the initial categorization based on the context of the microservice container.

* * * * *